DEFENSIVE PUBLICATION T864011

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JULY 15, 1969

864 O.G. 731

808,669

SELENIUM SENSITIZERS FOR SILVER HALIDE EMULSIONS

Arthur Herz, Kodak Park Division, Rochester, N.Y. 14650

Filed Mar. 19, 1969. Published July 15, 1969
Int. Cl. G03c *1/28*
U.S. Cl. 96—108
No Drawing. 13 Pages Specification

Selenium sols are used to sensitize a photographic silver halide. The sensitivity and contrast of a photographic silver halide sensitized with a selenium sol can be further enhanced by the addition of certain reducing compounds, i.e., certain thiols and selenols, such as 2-mercaptobenzothiazole, 2 - selenobenzothiazole, 4 - mercaptobutane sulfonate, 4-selenobutane sulfonate or precursors of these thiols or selenols, such as disulfides, diselenides, sulfinic acid and seleninic acids and salts thereof; phosphines; sulfites and reducing agents, such as hydroquinone and ascorbic acid.